(12) United States Patent
Minamida

(10) Patent No.: US 8,209,377 B2
(45) Date of Patent: Jun. 26, 2012

(54) DATA PROCESSING APPARATUS AND METHOD

(75) Inventor: Katsuhiro Minamida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 11/558,776

(22) Filed: Nov. 10, 2006

(65) Prior Publication Data

US 2007/0136673 A1 Jun. 14, 2007

(30) Foreign Application Priority Data

Dec. 8, 2005 (JP) ................................. 2005-355168

(51) Int. Cl.
G06F 15/16 (2006.01)
G06K 15/00 (2006.01)
H04N 1/00 (2006.01)

(52) U.S. Cl. ....... 709/203; 709/204; 709/217; 358/1.14; 358/400; 358/402

(58) Field of Classification Search .......... 709/201–203, 709/217–219

See application file for complete search history.

(56) References Cited

U.S. PATENT DOCUMENTS

| | | | | |
|---|---|---|---|---|
| 6,092,101 | A * | 7/2000 | Birrell et al. ................... | 709/206 |
| 6,219,652 | B1 * | 4/2001 | Carter et al. ..................... | 705/59 |
| 2001/0051906 | A1 * | 12/2001 | Esposito ......................... | 705/35 |
| 2002/0002588 | A1 * | 1/2002 | Sugimoto ...................... | 709/206 |
| 2002/0006117 | A1 * | 1/2002 | Duske et al. ................... | 370/316 |
| 2002/0152275 | A1 * | 10/2002 | Bettis ............................ | 709/206 |
| 2003/0107771 | A1 * | 6/2003 | Shibata ......................... | 358/3.28 |
| 2003/0220883 | A1 * | 11/2003 | Block et al. ..................... | 705/59 |
| 2005/0183141 | A1 * | 8/2005 | Sawada .......................... | 726/16 |
| 2005/0204144 | A1 * | 9/2005 | Mizutani ....................... | 713/182 |
| 2006/0050177 | A1 * | 3/2006 | Ikeguchi et al. .............. | 348/553 |
| 2006/0056306 | A1 * | 3/2006 | Iwai et al. ..................... | 370/252 |
| 2006/0176500 | A1 * | 8/2006 | Hosoi et al. .................. | 358/1.14 |
| 2007/0067772 | A1 * | 3/2007 | Bustamante .................. | 718/100 |
| 2011/0235120 | A1 * | 9/2011 | Kinoshita et al. ............ | 358/1.15 |

FOREIGN PATENT DOCUMENTS

| | | | |
|---|---|---|---|
| CN | 1282486 | A | 1/2001 |
| JP | 3-044230 | A | 2/1991 |
| JP | 3-044239 | A | 2/1991 |
| JP | 3-044240 | A | 2/1991 |
| JP | 2001-160015 | A | 6/2001 |
| JP | 2002074525 | A * | 3/2002 |
| JP | 2002-312292 | A | 10/2002 |
| JP | 2004-334428 | A | 11/2004 |
| WO | 9931864 | A1 | 6/1999 |

* cited by examiner

*Primary Examiner* — Ian N Moore
*Assistant Examiner* — Jenee Alexander
(74) *Attorney, Agent, or Firm* — Canon U.S.A., Inc. IP Division

(57) ABSTRACT

Processing is performed to make a user to certainly read information, e.g., a document, to be read by the user. In the processing, a database of an information management server stores information to be read by the user, an ID identifying the information, and status information identifying whether the information is not yet read by the user. When the user wishes to operate an apparatus in a system, the operation of the apparatus is restricted if the information to be read by the user is unread. If the information to be read by the user is already read, the operation of the apparatus is permitted.

11 Claims, 14 Drawing Sheets

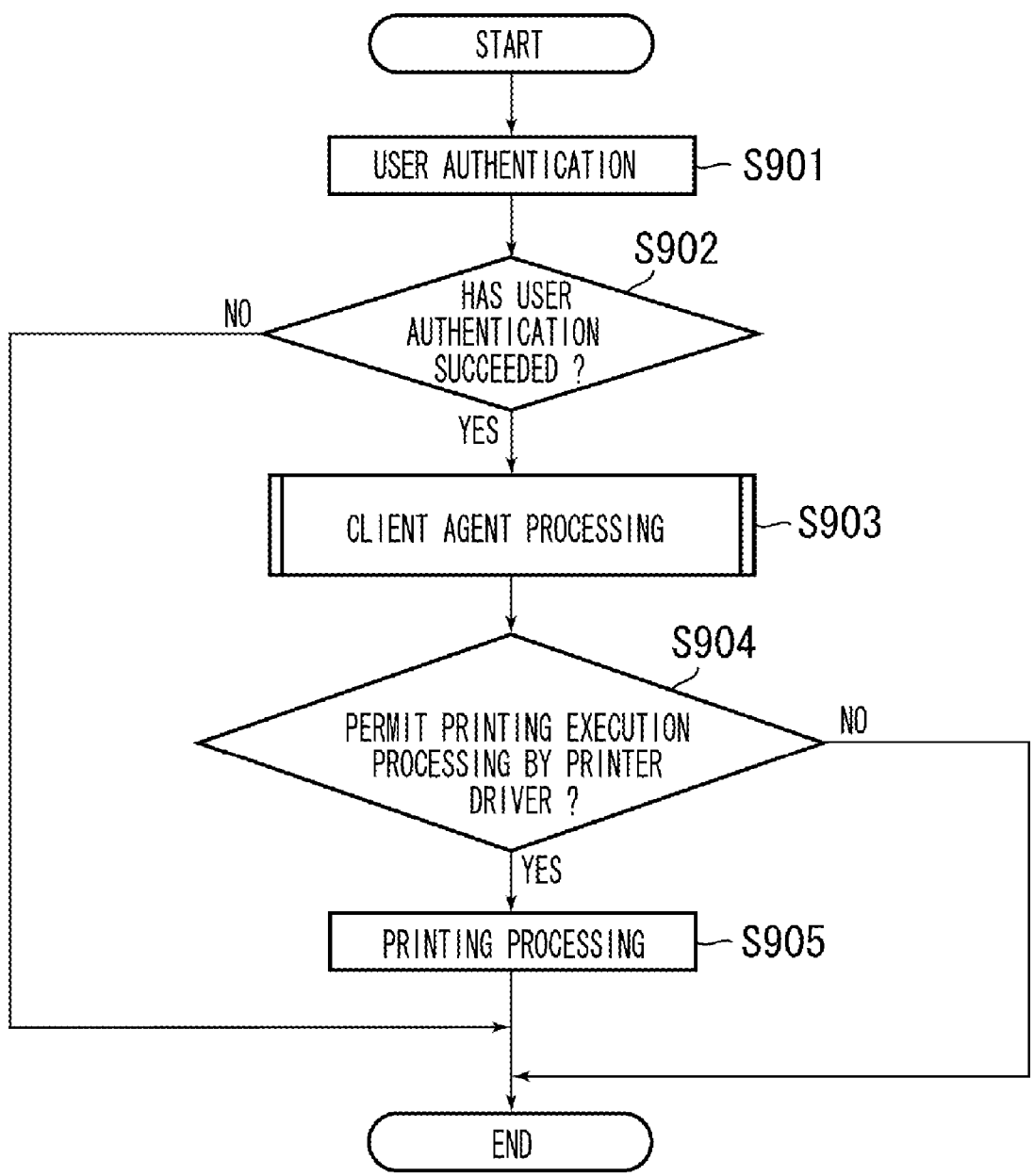

DATA PROCESSING APPARATUS AND METHOD

BACKGROUND OF THE INVENTION

1. Field of the Invention

The present invention relates to a data processing apparatus and a method thereof, and more particularly, to a data processing apparatus configured to prompt a user to read information provided for the user and a method thereof.

2. Description of the Related Art

A conventional information management system transmits information, e.g., documents, to a client terminal from an information management server via a network and notifies the information to a user of the client terminal. For example, the information management system uses an e-mail as a method for notifying a newly registered document to a user. With the information management system using an e-mail, a sender can use a message disposition notification function of an e-mail application so as to confirm whether a recipient has acknowledged the transmitted e-mail.

However, in an information management system using a method for notifying a newly registered document by an e-mail, a recipient may not notice the e-mail. Thus, the recipient does not necessarily read the notified document.

Therefore, if an e-mail for notifying the message disposition confirmation has not arrived yet, the sender may retransmit the same e-mail or transmit an e-mail to prompt the recipient to read the document. This imposes a high burden on the sender. Further, the recipient may not read the newly registered document even when the sender transmits these mails.

In this regard, numerous methods have been proposed for prompting reading of an unread document. For instance, Japanese Patent Application Laid-Open No. 2004-334428 discusses a method for notifying information managed in an information managing system to a user, who is expected to read the information, in real time using an instant message.

Japanese Patent Application Laid-Open No. 3-44230 discusses a method for forcibly outputting an unread document in order to notify the unread document and secure a storage capacity of a server.

Also, Japanese Patent Application Laid-Open No. 3-44239 and Japanese Patent Application Laid-Open No. 3-44240 discuss a method in which a print server issues a reception list of facsimiles stored on a print server to a user who has logged in so as to notify reception of a facsimile document.

However, the conventional methods discussed in the above-described documents only notify an unread document or print a list of unread documents or the unread document itself. In such a case, there is a possibility that a user who is expected to read the unread document may not notice the document.

Thus, the aforementioned conventional methods have a problem that information, such as documents, expected to be read by a user may remain unread by the user.

SUMMARY OF THE INVENTION

A feature of the present invention is directed to a data processing apparatus, method, and program capable of solving the above-described problem. Another feature of the present invention is directed to a data processing apparatus, method, and program capable of causing a user to certainly read information, such as documents.

According to an aspect of the present invention, a data processing apparatus is provided which includes a reception unit configured to receive notification information indicating that information to be read by a user is unread; and a restriction unit configured to restrict data processing requested by the user until it is determined that the user has read the unread information based on the notification information received by the reception unit.

According to another aspect of the present invention, a information management server is provide which includes a storage unit configured to store identification information identifying whether information to be read by a user is unread; a reception unit configured to receive user information identifying the user from a data processing apparatus that the user uses; a determination unit configured to determine whether the information to be read by the user is unread based on the user information received by the reception unit and the identification information stored by the storage unit; and a transmission unit configured to, if it is determined by the determination unit that the information to be read by the user is unread, transmit notification information to the data processing apparatus.

According to yet another aspect of the present invention, a data processing method is provided which includes receiving notification information indicating that information to be read by a user is unread; and restricting data processing requested by the user until it is determined that the user has read the unread information based on the notification information received.

Moreover, according to another aspect of the present invention, a data processing method is provided which includes storing, in a storage device, identification information identifying whether information to be read by a user is unread; receiving user information identifying the user from a data processing apparatus that the user uses; determining whether the information to be read by the user is unread based on the user information received and the identification information stored in the storage device; and if it is determined that the information to be read by the user is unread, transmitting notification information to the data processing apparatus.

Additionally, according to yet another aspect of the present invention, a computer readable medium is provided containing computer-executable instructions for executing a data processing method. Here, the medium includes computer-executable instructions for storing, in a storage device, identification information identifying whether information to be read by a user is unread; computer-executable instructions for receiving user information identifying the user from a data processing apparatus that the user uses; computer-executable instructions for determining whether the information to be read by the user is unread based on the user information received and the identification information stored in the storage device; and computer-executable instructions for transmitting notification information to the data processing apparatus if it is determined that the information to be read by the user is unread.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a flowchart illustrating an example of an operation of a system when a user of a client PC performs printing using an MFP according to an exemplary embodiment of the present invention.

DETAILED DESCRIPTION OF THE EMBODIMENTS

Various exemplary embodiments, features, and aspects of the present invention will now herein be described in detail below with reference to the drawings.

Figure 1:
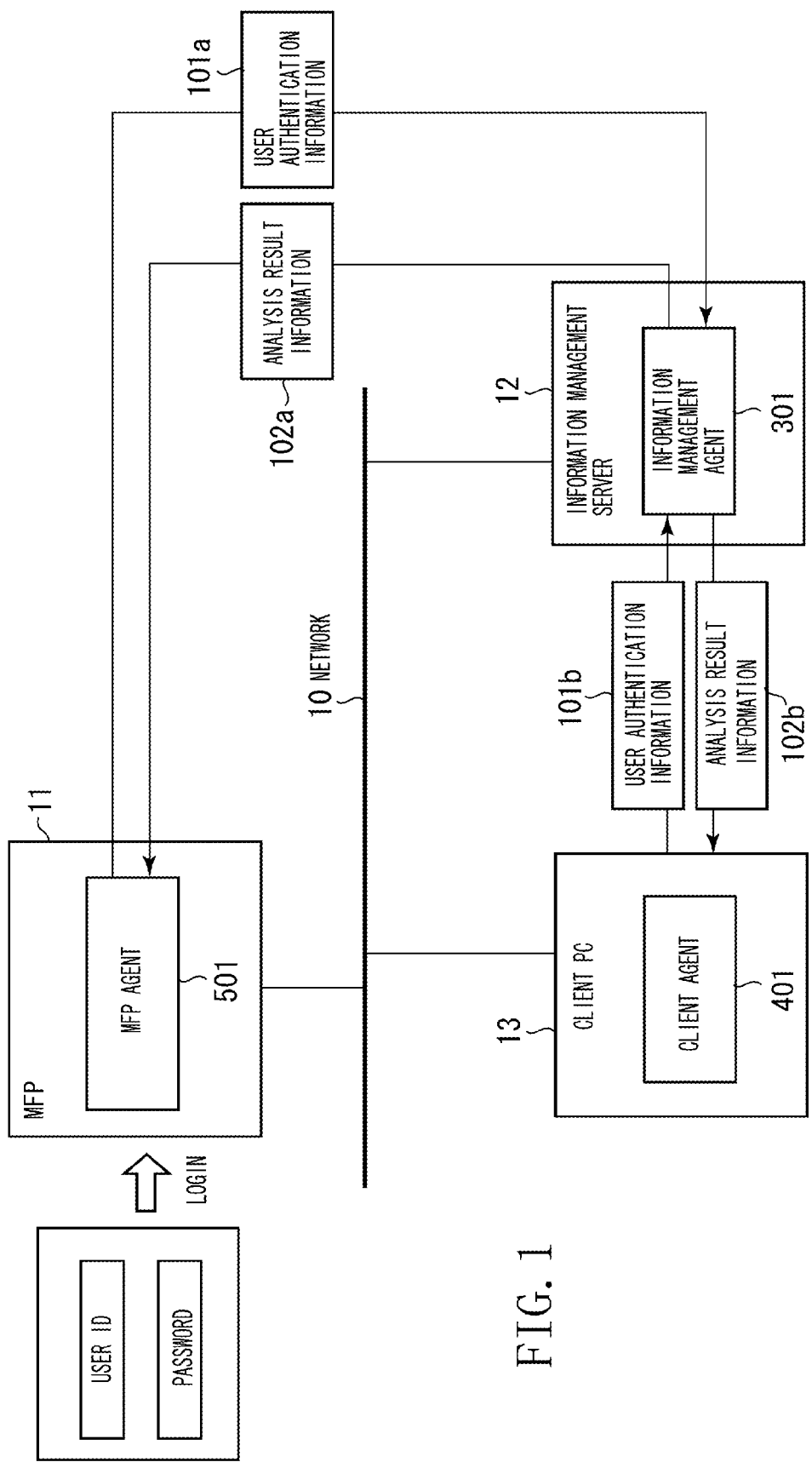
FIG. 1 is a block diagram illustrating an example of a configuration of a system according to an exemplary embodiment of the present invention.

FIG. 1 is a block diagram illustrating an example of a configuration of a system according to an exemplary embodiment.

An MFP 11 in the system in FIG. 1 can authenticate a user using the system. An information management server 12 manages various documents using a database 305a (see FIG. 3), and specifically manages important documents (see documents B and D in FIG. 3) by adding an attribute (hereinafter referred to as a forcible ID) to those for identifying the important documents.

Further, the present exemplary embodiment can realize a single sign-on using a common user account as for a user authentication of the MFP 11, a user authentication of the information management server 12, and a user authentication of a client personal computer (PC) 13 (e.g., Windows® authentication). In the present exemplary embodiment, a user must execute a user authentication when using an MFP or a client PC (even when not using services on a network). That is, a user executes authentication processing with a common user account even when using any apparatuses in the system.

Further, in the present exemplary embodiment, an example is described in which user authentication information 101a and 101b and analysis result information 102a and 102b are stored in XML files. The user authentication information 101a and 101b are transmitted from the MFP 11 and the client PC 13, respectively, and the analysis result information 102a and 102b are transmitted from the information management server 12. Further, the user authentication information 101a and 101b and the analysis result information 102a and 102b are transmitted via a network 10. More particularly, the information is transmitted using a publicly known web service, i.e., the simple object access protocol (SOAP) on the hyper text transfer protocol (HTTP). Further, the information is transmitted using a communication protocol written in the SOAP header. However, another communication protocol can be used in addition to the web service.

In FIG. 1, the network 10 is a communication line for connecting the MFP 11, the information management server 12, and the client PC 13 each other, and can be communicated with various protocols based on the Internet protocol. The MFP 11 can execute each processing of "Copy", "Print", "FAX", and "Send". The MFP 11 in the present embodiments needs to execute a user authentication when a user operates the MFP 11 so as to execute each processing of "Copy", "Print", "FAX", and "Send". Further, when the user authentication is successful, an MFP agent 501 operates so as to determine whether there is any important document that is not yet read by the authenticated user based on a communication result with the information management server 12. As a result of the determination, when there is an important document that is not yet read by the authenticated user, the MFP 11 receives and prints the unread important document from the information management server 12, and then permits the user to operate each processing of "Copy", "Print", "FAX", and "Send".

The client PC 13 generates an instruction to print data created by an application software with an operation of a user. The client PC 13 in the present embodiment needs to execute a user authentication when instructing printing. When the user authentication is successful, a client agent 401 operates so as to determine whether there is any important document that is not yet read by the authenticated user in the information management server 12 based on a communication result with the information management server 12. As a result of the determination, when there is an important document that is not yet read by the authenticated user, the client PC 13 receives and displays the unread important document from the information management server 12, and then permits the user to execute a print instruction of a desired document.

Figure 3:
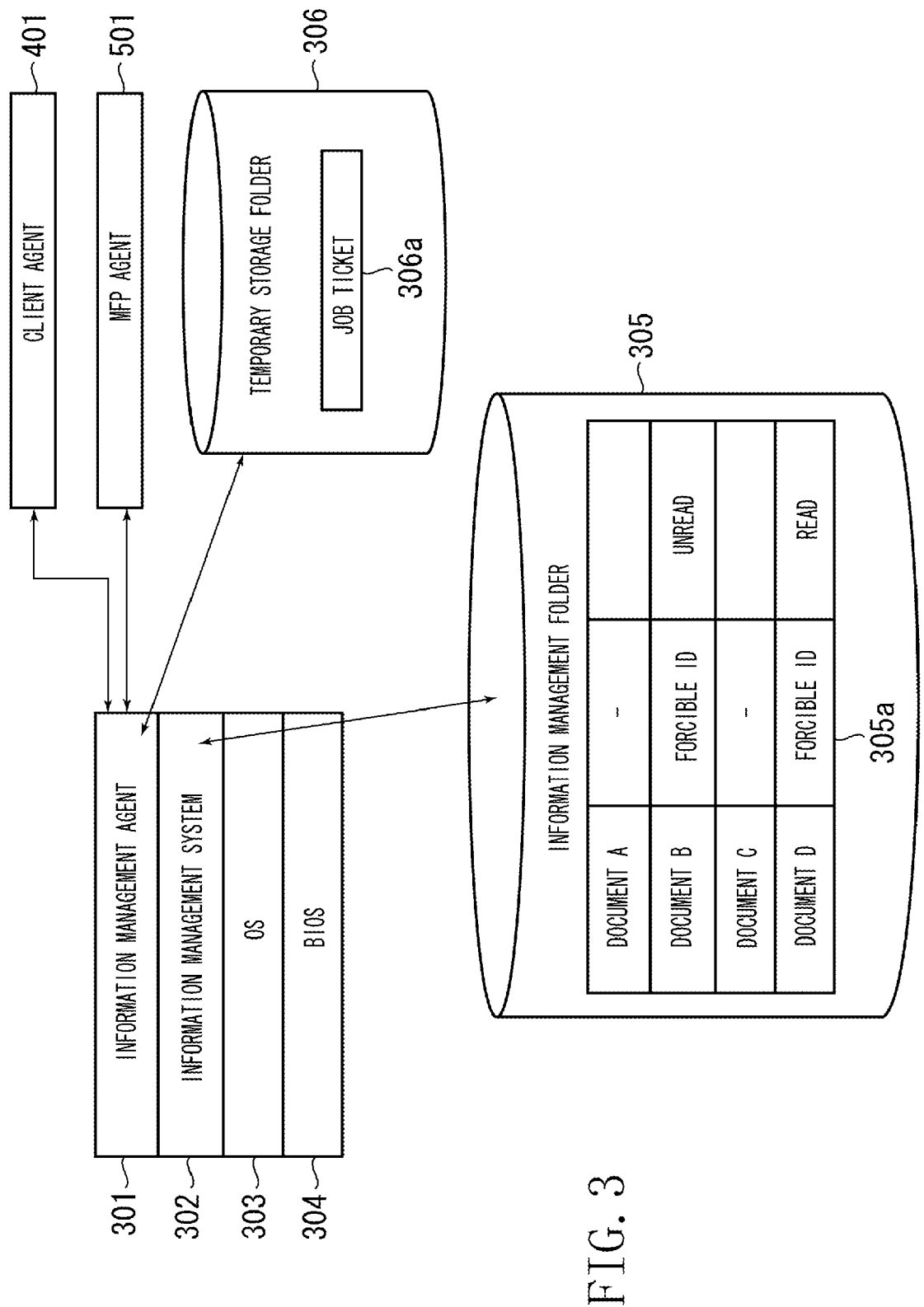
FIG. 3 is a view illustrating an example of a configuration of a software module operating on an information management server according to an exemplary embodiment of the present invention.

The information management server 12 includes a function for storing information of documents in a database 305a in an information management folder 305 illustrated in FIG. 3. An information management agent 301 of the information management server 12 determines whether there is any important document that is not yet read by a user of the MFP 11 or the client PC 13 in the database 305a of the information management folder 305 in response to a request from the MFP 11 or the client PC 13. As a result of the determination, when there is an important document that is not yet read by the user of the MFP 11 or the client PC 13, the information management server 12 outputs the unread important document to the MFP 11 or the client PC 13.

The information management server 12 in the present embodiment manages a plurality of documents to be read by a user. The information management server 12 then manages whether each document is already read or not yet read for every user. Further, as for an important document, e.g., which all employees should certainly read, such as an internal notification, a forcible ID is added to the important document and registered in the database 305a, as illustrated in FIG. 3. The forcible ID indicates that the document added with the forcible ID is an important document to be forcibly read by a user. The important document and the forcible ID are associated with each other to be registered in the database 305a. Hereinafter, the important document added with the forcible ID may be referred to as a forcible ID document.

Figure 2A:
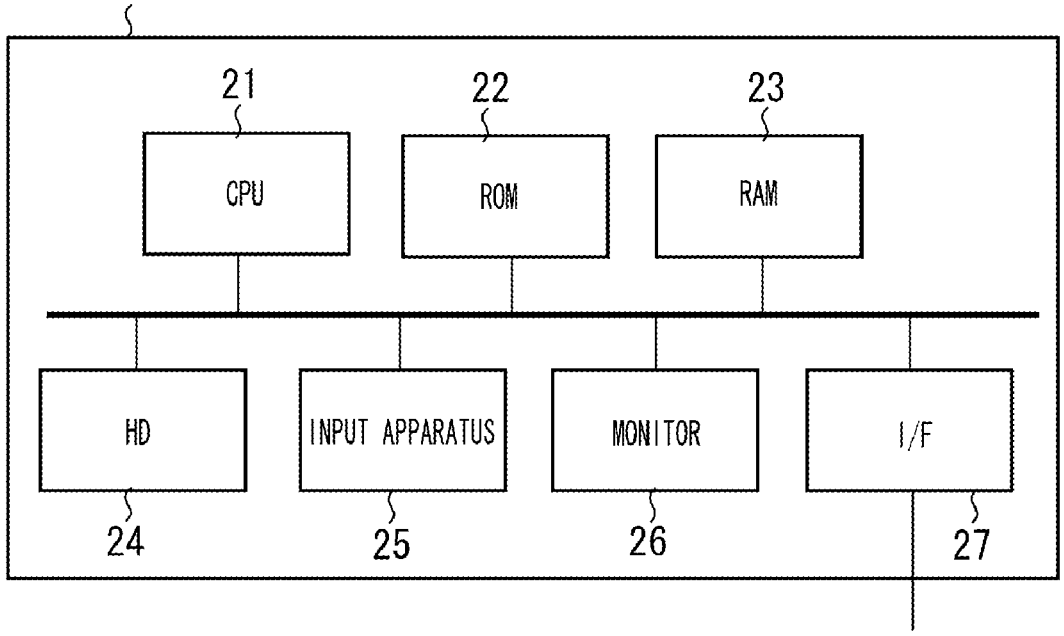
FIGS. 2A and 2B are block diagrams illustrating an example of configurations of hardware of an information management server, a client personal computer (PC), and a multifunction peripheral (MFP) according to an exemplary embodiment of the present invention.
Figure 2B:
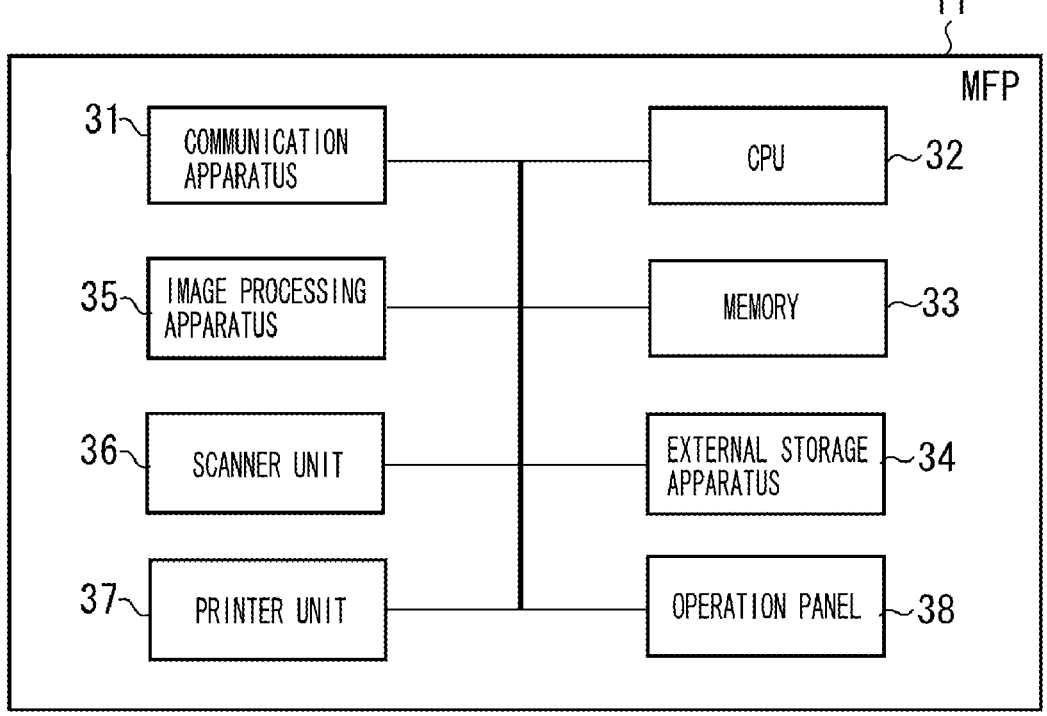

FIGS. 2A and 2B are block diagrams illustrating an example of configurations of hardware of the information management server 12, the client PC 13, and the MFP 11. More particularly, FIG. 2A is a block diagram illustrating an example of configurations of hardware of the information management server 12 and the client PC 13, and FIG. 2B is a block diagram illustrating an example of a configuration of hardware of the MFP 11. In addition, the information management server 12 and the client PC 13 can use an ordinary personal computer (PC), i.e., an IBM-PC/AT compatible apparatus or the like, in the present embodiment, and are illustrated in FIG. 2A to have a similar block diagram.

In FIG. 2A, a CPU 21 directly or indirectly controls each device connected with an internal bus, and executes programs for operating the information management server 12 and the client PC 13 in the present embodiment. A ROM 22 stores basic software, e.g., a basic input/output system (BIOS). A RAM 23 is used as a work area of the CPU 21. Further, the RAM 23 temporarily stores data to load an information management agent 301 and a client agent 401, which are programs. A hard disk drive (HDD) 24 stores programs as files. An input apparatus 25 is a user interface. For example, when an operation screen is displayed on a monitor 26 in the program, the user can input his operation to the operation screen using the input apparatus 25. The monitor 26 displays the operation screen. A interface (I/F) 27 is used for connecting the information management server 12 and the client PC 13 to the network 10.

The MFP 11 in the present embodiment illustrated in FIG. 2B is a network compatible type MFP which can provide a printing service, a scanning service, a storage service, and a transmission service to a computer terminal via the network 10. In this case, the transmission service includes a FAX transmission, an e-mail transmission, and a file transfer.

For example, the hardware configuration of the MFP 11 includes a communication apparatus 31, a central processing unit (CPU) 32, a memory 33, an external storage apparatus (hereinafter referred to as an HDD) 34, an image processing apparatus 35, a scanner unit 36, a printer unit 37, and an operation panel 38.

The communication apparatus 31 communicates with external computer terminals (the information management server 12, the client PC 13, and the like) according to various protocols via the network 10, based on the Internet protocol, e.g., TCP/IP. Further, the communication apparatus 31 connects to a telephone line (not shown) so as to execute a publicly-known G3/G4 facsimile communication. The CPU 32 is a computer for executing a program for realizing various functions in the image processing apparatus 35. More particularly, the CPU 32 reads out the MFP agent 501, which is a program for realizing the operation of the MFP 11 in the present embodiment, from the HDD 34. Further, the CPU 32 executes the read-out program (the MFP agent 501) using the memory 33 as a work area. Further, the operation panel 38 is a user interface, which includes a touch panel function.

FIG. 3 is a view illustrating an example of a configuration of a software module operating on the information management server 12.

The information management server 12 manages forcible ID documents (documents B and D in FIG. 3) together with the other shared information (documents A and C in FIG. 3) in the database 305a in the information management folder 305. As described above, the forcible ID documents (documents B and D in FIG. 3) are added with the forcible ID, and are also added with status information identifying whether a user has read the forcible ID document or not (the document B is unread and the document D is read in FIG. 3).

The information management agent 301 performs processing to extract forcible ID documents that a user does not yet read, based on the user authentication information 101a or 101b received from the MFP 11 or the client PC 13. Then, the information management agent 301 sends the processed results to the MFP 11 or the client PC 13 as the analysis result information 102a or 102b. The information management agent 301 operates on a platform, e.g., a BIOS 304 and an operating system (OS) 303. As for the OS 303, an OS having a user authentication function, e.g., the publicly-known Windows® XP can be used.

Further, the information management agent 301 updates the database 305a based on a database update request signal received from the MFP 11 or the client PC 13 by the process of the MFP agent 501 or the client agent 401. In addition, the OS 303 performs handling of HTTP and SOAP. Further, an information management system 302 manages the database 305a.

Also, the information management agent 301 executes JOB ticket creation processing for creating a JOB ticket 306a and stores the created JOB ticket 306a in a temporary storage folder 306 in the HD 24 in the information management server 12.

Figure 4:
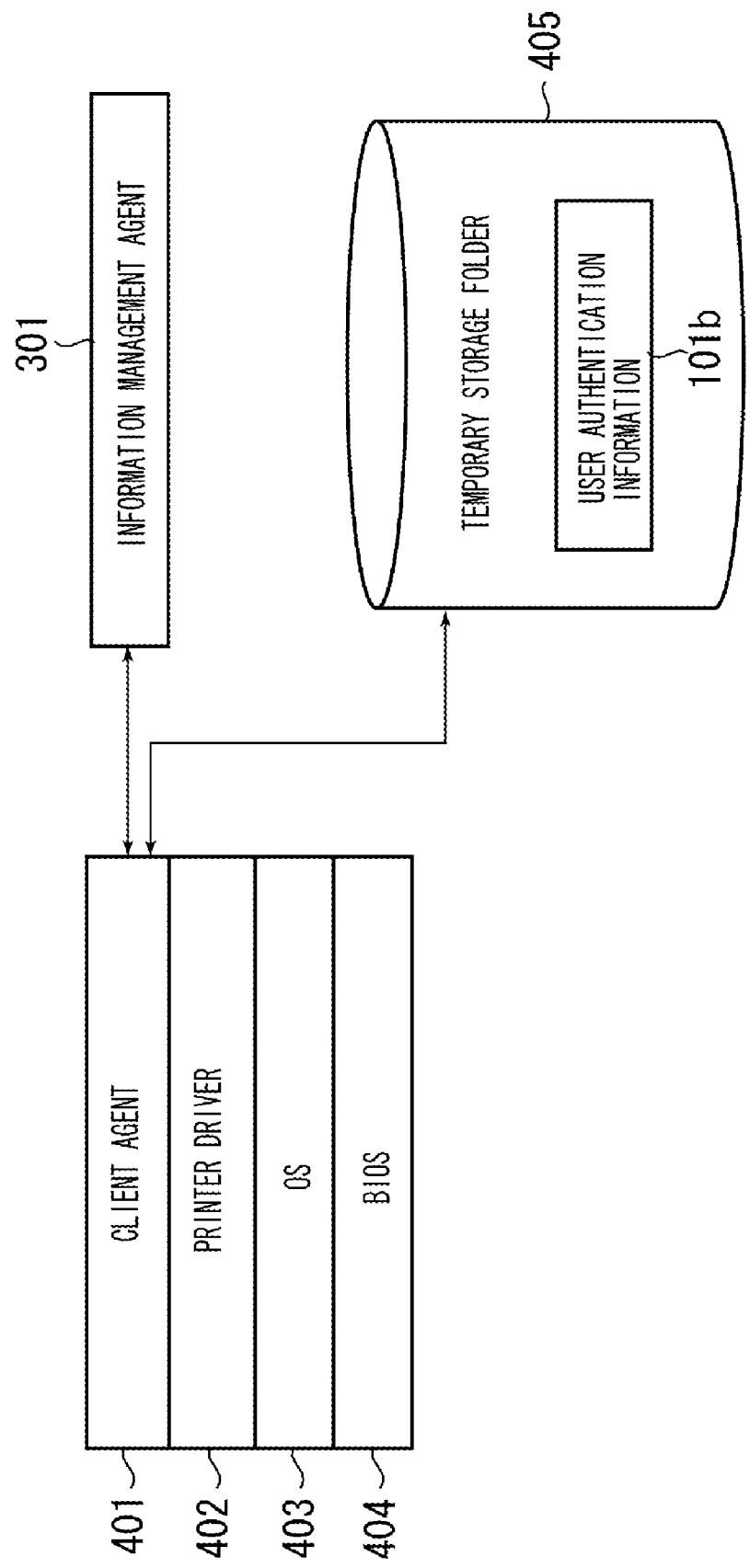
FIG. 4 is a view illustrating an example of a configuration of a software module operating on a client personal computer (PC) according to an exemplary embodiment of the present invention.

FIG. 4 is a view illustrating an example of a configuration of a software module operating on the client PC 13.

A client agent 401 of the client PC 13 extracts the user authentication information (the Windows® authentication information) 101b input based on the operation of the input apparatus 25 by a user, and temporarily stores the user authentication information 101b in a temporary storage folder 405. Further, after an instruction for executing print processing in a printer driver 402 is detected, the client agent 401 transmits the user authentication information 101b stored in the temporary management folder 405 to the information management agent 301 of the information management server 12. The client agent 401 receives the analysis result information 102b indicating results processed by the information management agent 301 based on the user authentication information 101b. In addition, the client agent 401 operates on a platform, e.g., a BIOS 404 and an OS 403. Further, the OS 403 performs handling of HTTP and SOAP.

Figure 5:
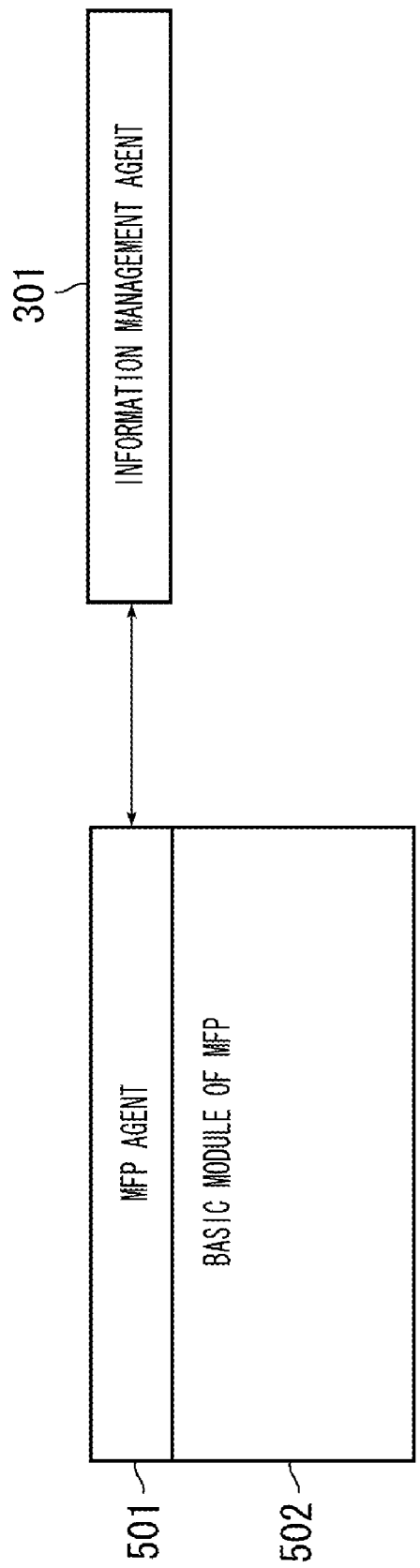
FIG. 5 is a view illustrating an example of a configuration of a software module operating on a MFP according to an exemplary embodiment of the present invention.

FIG. 5 is a view illustrating an example of a configuration of a software module operating on the MFP 11.

The MFP agent 502 operates on a basic module 502 of the MFP 11. The MFP agent 501 extracts the user authentication information 101a input based on the operation of the operation panel 38 by a user using the MFP 11, and transmits the user authentication information 101a to the information management agent 301. Further, the MFP agent 501 receives the analysis result information 102a indicating results processed by the information management agent 301 based on the user authentication information 101a. In addition, the basic module 502 of the MFP 11 performs handling of HTTP and SOAP.

An example of a flow for controlling in the system of the present exemplary embodiment will now be described with reference to flowcharts in FIGS. 6, 7, 9 to 14.

Figure 6:
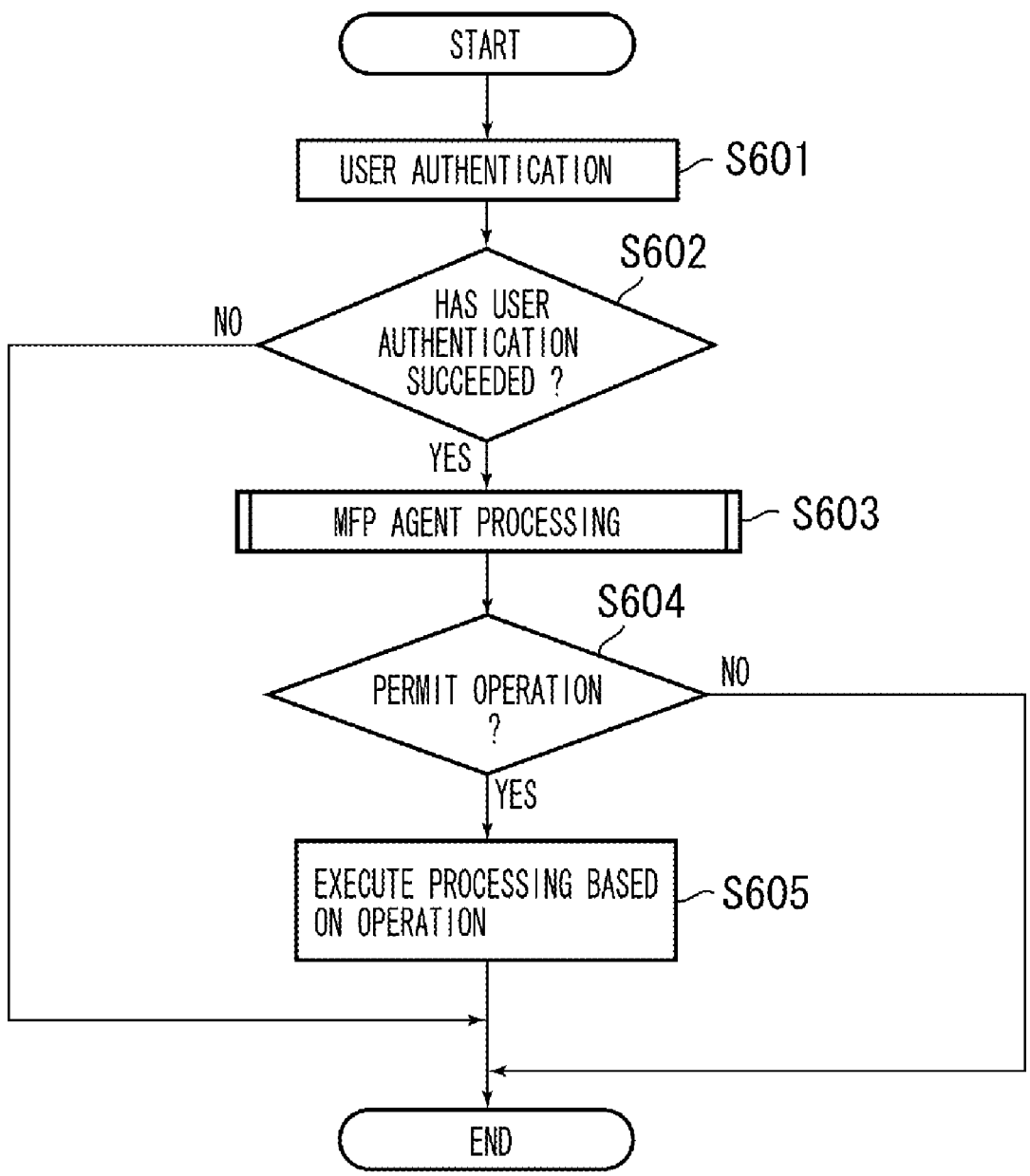
FIG. 6 is a flowchart illustrating an example of an operation of a system when a user operates an operation panel of an MFP to use functions, e.g., "Copy", "Print", "FAX", and "Send".

First, an example of an operation of the system for using functions of "Copy", "Print", "FAX", and "Send" will be described with reference to a flowchart in FIG. 6. These functions can be used when a user operates the operation panel 38 of the MFP 11. FIG. 6 illustrates a flow of processing controlled by the CPU 32 based on program code loaded on the memory 33.

A user using the MFP 11 enters, for example, a user ID and a password based on the operation of the operation panel 38 (step S601). Then, the MFP basic module 502 collates the entered user ID and password with a user ID and password registered in advance. Further, the MFP basic module 502 determines whether the entered user ID and password agree with the user ID and password registered in advance, and determines whether the user authentication has succeeded (step S602).

As a result of the determination, when the user authentication has succeeded (YES in step S602), the CPU 32 executes MFP agent processing for determining whether the use of the functions of "Copy", "Print", "FAX", and "Send" is permitted (step S603). Then, the MFP agent 501 determines whether the use of the functions of the MFP 11, i.e., "Copy", "Print", "FAX", and "Send", is permitted based on the executed result of the MFP agent processing (step S604).

When the use of the functions of the MFP 11 is permitted based on a result of this determination (YES in step S604), the MFP agent 501 brings an operation of the operation panel 38 into an acceptable state. The operation of the operation panel 38 is for realizing the functions of the MFP 11. Then, the MFP agent 501 operates the MFP 11 according to the accepted operation (step S605).

Accordingly, the user can execute the desired operation, that is, "Copy", "Print", "FAX", and "Send". "Copy" is a process to read out a document set by a user by the scanner unit 36, and to print an image based on the read-out image data by the printer unit 37. "Print" is a process to read out data stored in the HDD 34 by operating the operation panel 38, and to print the date by the printer unit 37. "FAX" is a process to transmit the image data or the data stored in the HDD 34 by facsimile via a telephone line. The image data is read-out from a document set by the user by the scanner unit 36. Further, the process of "FAX" includes a polling reception in which the user calls a desired telephone number by operating the operation panel 38, and receives image data from the destination. The processing of "Send" is to transmit the image data or the data stored in the HDD 34 by the communication apparatus 31 via a local area network or the Internet according to a network protocol, e.g., an e-mail, FTP, SMB, and the like. The image data is read-out from a document set by the user by the scanner unit 36.

In addition, when the user authentication fails in step S602 or when the use of the functions of the MFP 11 is not permitted in step S604, the processing ends.

Figure 7:
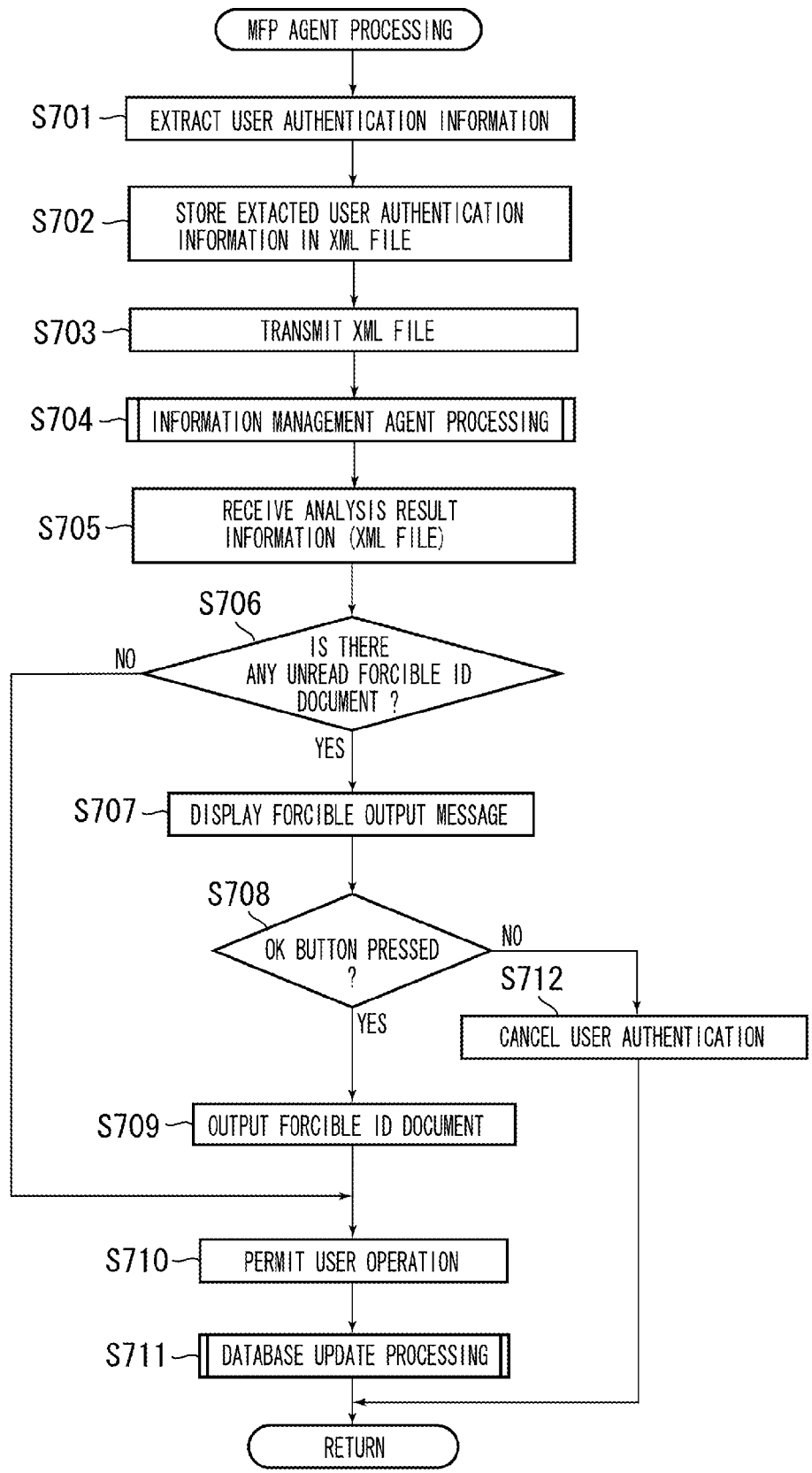
FIG. 7 is a flowchart illustrating an example of MFP agent processing in step S603 in FIG. 6.

An example of the MFP agent processing in step S603 in FIG. 6 will be described with reference to a flowchart in FIG. 7.

The MFP agent 501 extracts user authentication information including a user ID and password of a user succeeding in the user authentication (step S701). Then, the MFP agent 501 stores the extracted user authentication information in an XML file (step S702).

Then, the MFP agent 501 transmits the user authentication information 101a stored in an XML file to the information management agent 301 in the information management server 12 (step S703). Then, the information management agent 301 executes information management agent processing (step S704). For example, the information management agent processing performs processing for determining whether there is any forcible ID document that is not yet read by a user identified by the user authentication information 101a. The user authentication information 101a is transmitted from the MFP agent 501. Then, the information management agent 301 transmits the analysis result information 102a which indicates results of the processing, to the MFP agent 501. The information management agent processing will be described below in detail with reference to FIG. 11.

The MFP agent 501 receives the analysis result information 102a transmitted from the information management agent 301 (step S705). Based on the received analysis result information 102a, the MFP agent 501 determines whether there is any forcible ID document that is not yet read by the user (step S706). The user is identified by the user authentication information 101a transmitted in step S703.

Figure 8A:
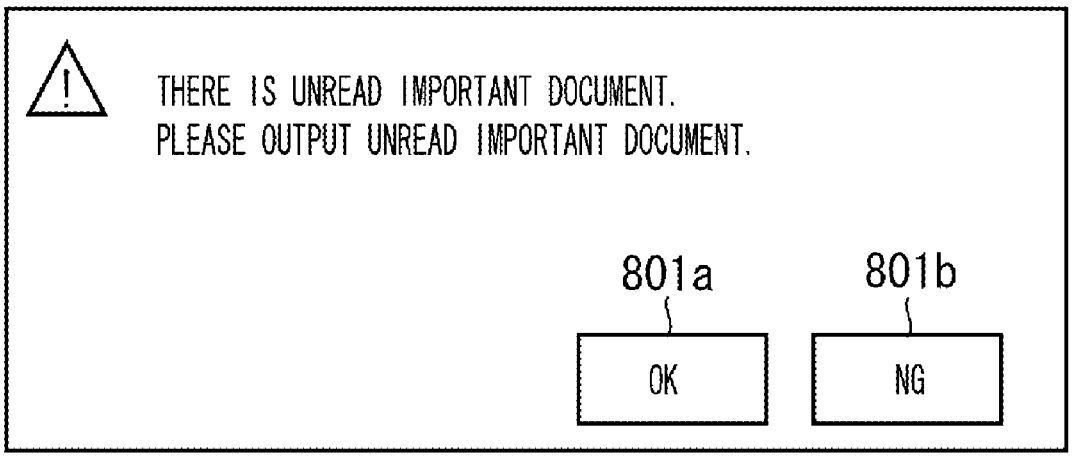
FIGS. 8A and 8B are views respectively illustrating an example of a forcible output message and an output-disabled message.

As a result of the determination, when there is a forcible ID document that is not yet read by the user (YES in step S706), the MFP agent 501 displays a forcible output message 801 as illustrated in FIG. 8A on the operation panel 38 of the MFP 11 (step S707). The forcible output message 801 is to inform the user that there is an unread forcible ID document and the user is asked to agree to forcibly output the forcible ID document.

Then, the MFP agent 501 determines which of an OK button 801a or an NG button 801b is pressed by the user (step S708). These buttons are displayed on the forcible output message 801. As a result of the determination, when the user has pressed the OK button 801a (YES in step S708), the MFP agent 501 outputs the corresponding forcible ID document to the printer unit 37 so as to print it (step S709). In addition, it is desirable that the information of the user is added to the forcible ID document to be printed. The reason of this is to prevent the user from leaving there while not taking the printed document. Further, when printing of the forcible ID document ends, the MFP agent 501 permits the user to operate the MFP 11, and executes the operation based on the operation of the MFP 11 (step S710).

Finally, in order to change the unread status of the forcible ID document to the read status, the MFP agent 501 executes database update processing for updating the database 305a in the information management server 12 (step S711).

In step S706, when the MFP agent 501 determines that there is no unread forcible ID document (No in step S706), there is no need to output the forcible ID document. Thus, the process omits steps S707 to S709, and proceeds to step S710 so as to permit the user to operate the MFP 11.

Figure 8B:
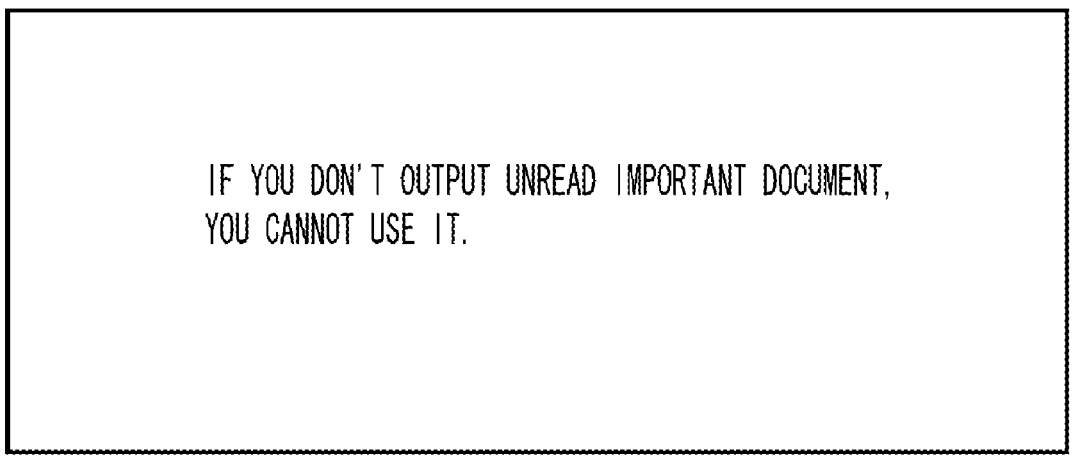

Further, when determining that the NG button 801b is pressed in step S708, the MFP agent 501 determines that the user does not accept the content of the forcible output message 801 (No in step S708). The process then proceeds to step S712. In step S712, the MFP agent 501 displays an output-disabled message 802 as illustrated in FIG. 8B on the operation panel 38 of the MFP 11. Then, the MFP agent 501 cancels the result of the user authentication of the MFP 11, and disables the operation for executing the functions of "Copy", "Print", "FAX", and "Send" of the MFP 11.

An example of an operation of the system when the user of the client PC 13 performs printing using the MFP 11 will be described with reference to a flowchart in FIG. 9. FIG. 9 illustrates a flow of a process controlled by the CPU 21 based on program code loaded on the RAM 23 of the client PC 13.

First, the client agent 401 enters, for example, a user ID and a password based on the operation of the input apparatus 25 by a user using the client PC 13, and tries to log into Windows® (step S901). Then, the client agent 401 collates, for example, the entered user ID and password and a user ID and password registered in advance. The client agent 401 determines, for example, whether the entered user ID and password agree with the user ID and password registered in advance (step S902). That is, the client agent 401 determines whether the user authentication (Windows® log-in authentication) has succeeded.

As a result of the determination, when the user authentication has succeeded (YES in step S902), the client agent 401 performs the following process. That is, when the user generates an instruction to print data created by the application software, the client agent 401 executes client agent processing for determining whether print processing is permitted (step S903). This print processing is performed by the printer driver 402 in order to use the print function of the MFP 11. Further, the client agent 401 determines whether the print processing performed by the printer driver 402 is permitted based on a result of executing the client agent processing (step S904). As a result of the determination, when the print processing is permitted (YES in step S904), the printer driver 402 executes the print processing of the data which the user generates an instruction to print (step S905).

When the client agent 401 determines that the user authentication fails in step S902 or when the print processing is not permitted in step S904, the process ends. That is, in this case, the user cannot print anything.

Figure 10:
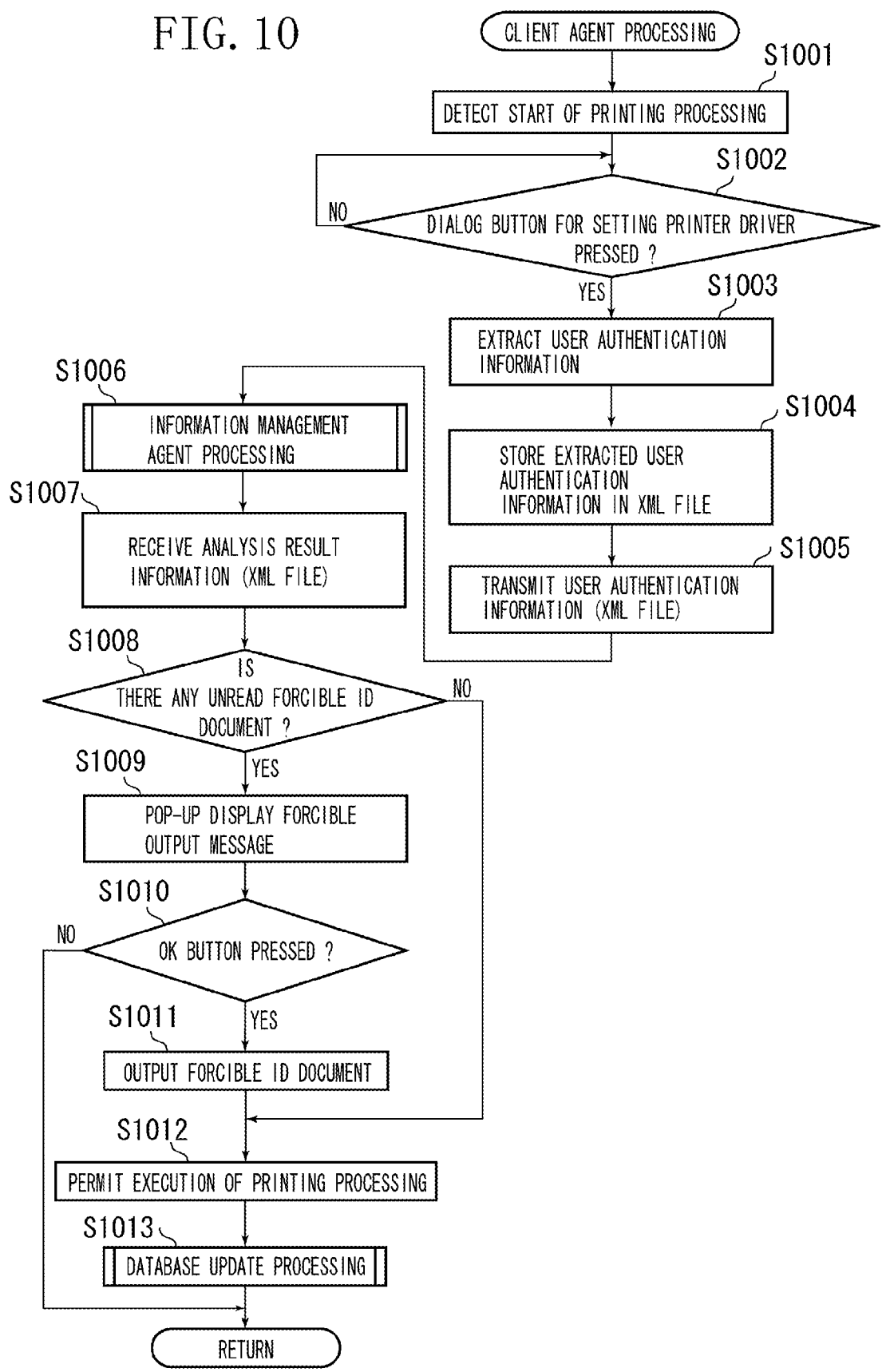
FIG. 10 is a flowchart illustrating an example of client agent processing in step S903 in FIG. 9.

Now, an example of the client agent processing in step S903 in FIG. 9 will be described with reference to a flowchart in FIG. 10.

First, when a user of the client PC 13 causes the monitor 26 to display a dialog of the printer driver 402 in order to print data created by an application, the client agent 401 detects that the printing processing starts (step S1001). The client agent 401 waits until the user of the client PC 13 presses a button of the dialog of the printer driver 402 (step S1002). When the user presses the button of the dialog of the printer driver 402, the client agent 401 extracts user authentication information (Windows® authentication information) from the temporary storage folder 405 (step S1003).

The client agent 401 stores the extracted user authentication information in an XML file (step S1004). Then, the client agent 401 transmits the user authentication information stored in an XML file to the information management agent 301 (step S1005). Then, the information management agent 301 executes the information management agent processing (step S1006). For example, the information management agent processing performs processing for determining whether there is any forcible ID document that is not yet read by a user identified by the user authentication information 101b transmitted from the client agent 401. Then, the information management agent processing transmits the analysis result information 102b indicating the processed results. The information management agent processing will be described below in detail with reference to FIG. 11.

The client agent 401 receives the analysis result information 102b transmitted from the information management agent 301 (step S1007). The client agent 401 determines whether there is any forcible ID document that is not yet read by the user identified by the user authentication information 101b transmitted in step S1005, based on the received analysis result information 102b (step S1008). As a result of the determination, when there is a forcible ID document that is not yet read by the user (YES in step S1009), the client agent 401 pop-up displays the forcible output message 801 on the monitor 26, for example, as illustrated in FIG. 8A (step S1009).

The client agent 401 determines which of the OK button 801a or the NG button 802b is pressed by the user based on the operation of the input apparatus 25 by the user (step S1010). These buttons are displayed on the forcible output message display 801. As a result of the determination, when the user pressed the OK button 801a (YES in step S1010), the client agent 401 outputs the corresponding forcible ID document (step S1011). In this case, the output of the forcible ID document may be the output for displaying on the monitor 26 or the output for printing by the MFP 11, which is a printer corresponding to the printer driver 402. The user can select the method of outputting the forcible ID document. In addition, when the forcible ID document is displayed on the monitor 26, it is desirable that the output is determined to end by the following conditions. That is, scrolling arrives at the undermost line and scrolling is performed at a predetermined speed or less. The reason of these conditions is to confirm that the forcible ID document is certainly read by the user.

Then, the client agent 401 permits the print processing of the data desired by the user by the printer driver 402, and the printer driver 402 executes the print processing (step S1012). Finally, in order to change the status of the forcible ID document to the read status, the client agent 401 executes database update processing for updating the database 305a of the information management server 12 (step S1013).

In step S1008, when the client agent 401 determines there is no unread forcible ID document, there is not need to output the forcible ID document. Thus, the process omits steps S1009 to S1011, and the process then proceeds to step S1012. Also, when it is determined that the NG button 801b is pressed in step S1010, the client agent 401 determines that the content of the forcible output message 801 is not accepted by the user. The process then ends.

Although the above-described processes are described in the case of using the print function of the MFP 11 with the printer driver 402, the present invention is not limited to this case. For example, the present invention can be applied to various processes, i.e., the case of transmitting data created by the client PC 13 in facsimile by the FAX function of the MFP 11, and the case of storing the data in the HDD 34 of the MFP 11. In these cases, the processes are performed by a facsimile driver or a data storage application instead of the printer driver in the above-described process.

Figure 11:
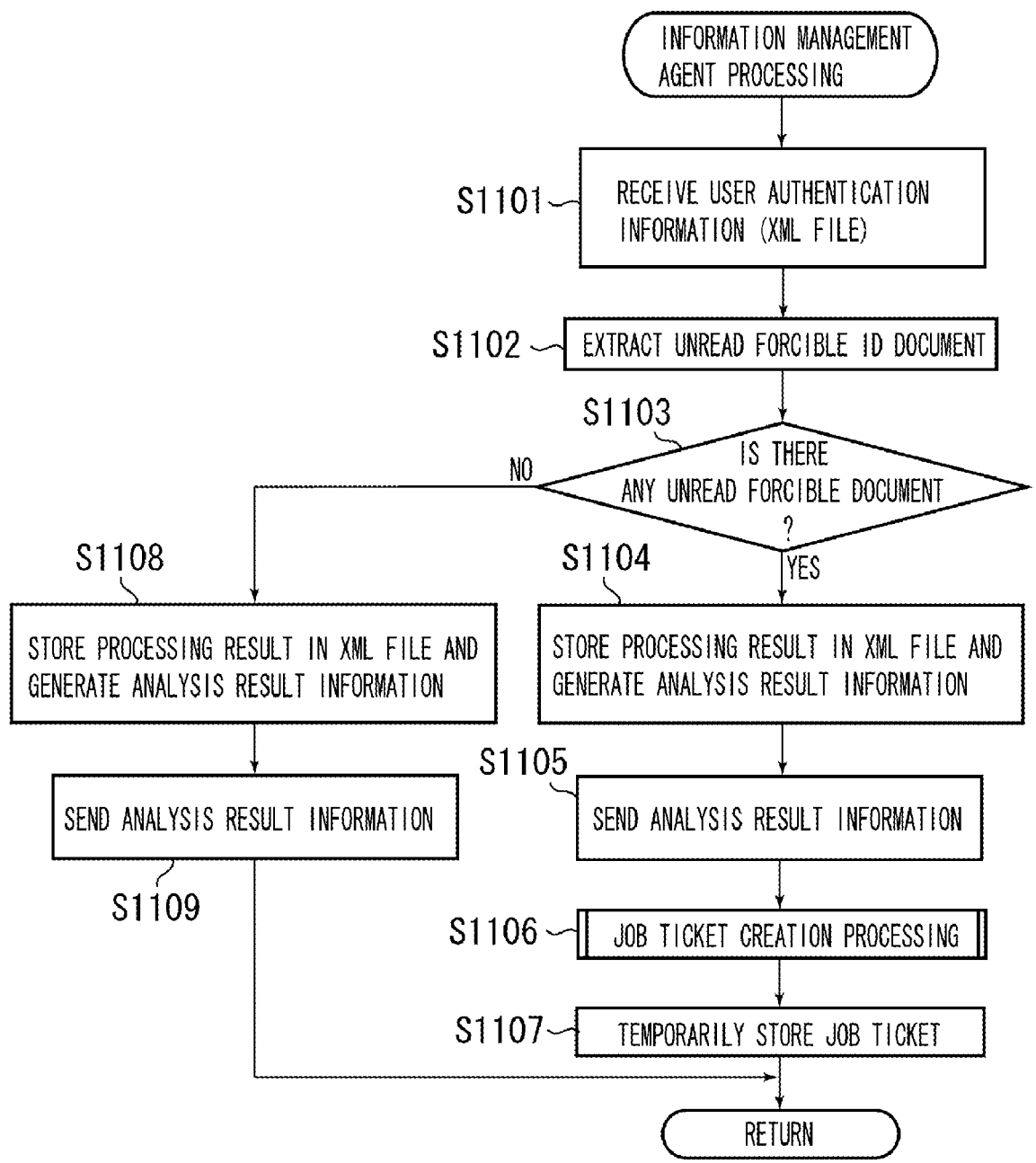
FIG. 11 is a flowchart illustrating an example of information management agent processing in step S704 in FIG. 7 and in step S1006 in FIG. 10.

An example of the information management agent processing in step S704 in FIG. 7 and step S1006 in FIG. 10 will be described with reference to a flowchart in FIG. 11. FIG. 11 illustrates a flow of processing controlled by the CPU 21 based on program code loaded on the RAM 23 of the information management server 12.

First, the information management agent 301 receives the user authentication information 101a or 101b in XML file format transmitted from the MFP agent 501 or the client agent 401 (step S1101). The information management agent 301 analyzes the database 305a in the information management system 302 based on the received user authentication information 101a or 101b. Then, the information management agent 301 extracts any forcible ID document that is not yet read by the corresponding account user (step S1102).

Then, the information management agent 301 determines whether there is any forcible ID document that is not yet read by the corresponding user based on a result of extracting in step S1102 (step S1103). As a result of the determination, when there is a forcible ID document that is not yet read by the corresponding user (YES in step S1103), the process proceeds to step S1104.

Next, the information management agent 301 stores information in an XML file indicating that there is a forcible ID document that is not yet read by the corresponding user. Thus, the information management agent 301 generates the analysis result information 102a or 102b (step S1104). Then, the information management agent 301 sends the generated analysis result information 102a or 102b to the agent 401 or 501, which is a sender of the user authentication information 101a or 101b received in step S1101 (step S1105).

Thereafter, the information management agent 301 executes JOB ticket creation processing for creating a JOB ticket 306a of the forcible ID document that is not yet read by the user (step S1106). Then, the information management agent 301 temporarily stores the created JOB ticket 306a in the temporary storage folder 306 in the HD 24 in the information management server 12 (step S1107). Then the process ends.

When, in step S1103, the information management agent 301 determines that there is no unread forcible ID document (NO in step 1103), the process proceeds to step S1108. Thereafter, the information management agent 301 stores information with an XML file indicating that there is no unread forcible ID document. Thus, the information management agent 301 generates the analysis result information 102a or 102b (step S1108). Then, the information management agent 301 sends the generated analysis result information 102a or 102b to the agent 401 or 501, which is a sender of the user authentication information 101a or 101b received in step S1101 (step S1109). Then process then ends.

Figure 12:
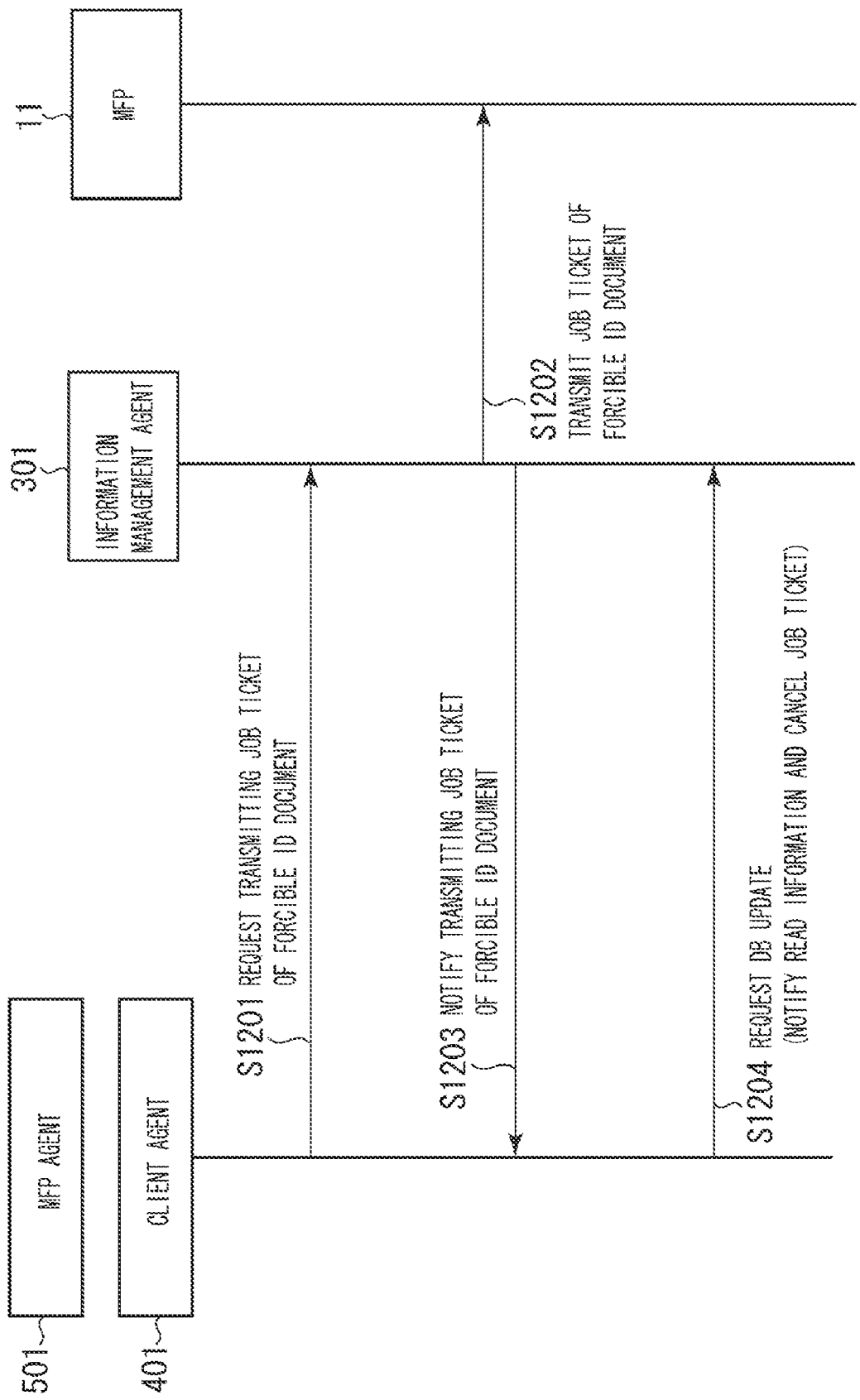
FIG. 12 is a flowchart illustrating an example of an operation of a system when outputting a forcible ID document.

An example of an operation of the system when the forcible ID document is output will be described with reference to a flowchart in FIG. 12. In the MFP agent processing (step S709) in FIG. 7 or the client agent processing (step S1011) in FIG. 10, an operation illustrated in FIG. 12 is performed.

First, the MFP agent 501 or the client agent 401 requests the information management agent 301 to transmit the JOB ticket 306a of the forcible ID document temporarily stored in the temporary storage folder 306 (step S1201).

The information management agent 301, receiving the request to transmit the JOB ticket 306a, transmits the JOB ticket 306a of the forcible ID document to the MFP 11 (step S1202). Then, the information management agent 301 notifies the agent 401 or 501, which has requested the information management agent 301 to transmit the JOB ticket 306a, that the JOB ticket 306a has been transmitted (step S1203). The agent 401 or 501, which has received the notification, transmits a request for updating the database 305a in the information management server 12 to the information management agent 301 (step S1204). The request for updating the database 305a includes information for canceling or deleting the JOB ticket 306a of the forcible ID document stored in the temporary storage folder 306 and information for changing the status information of the forcible ID document from the unread status to the read status.

Figure 13:
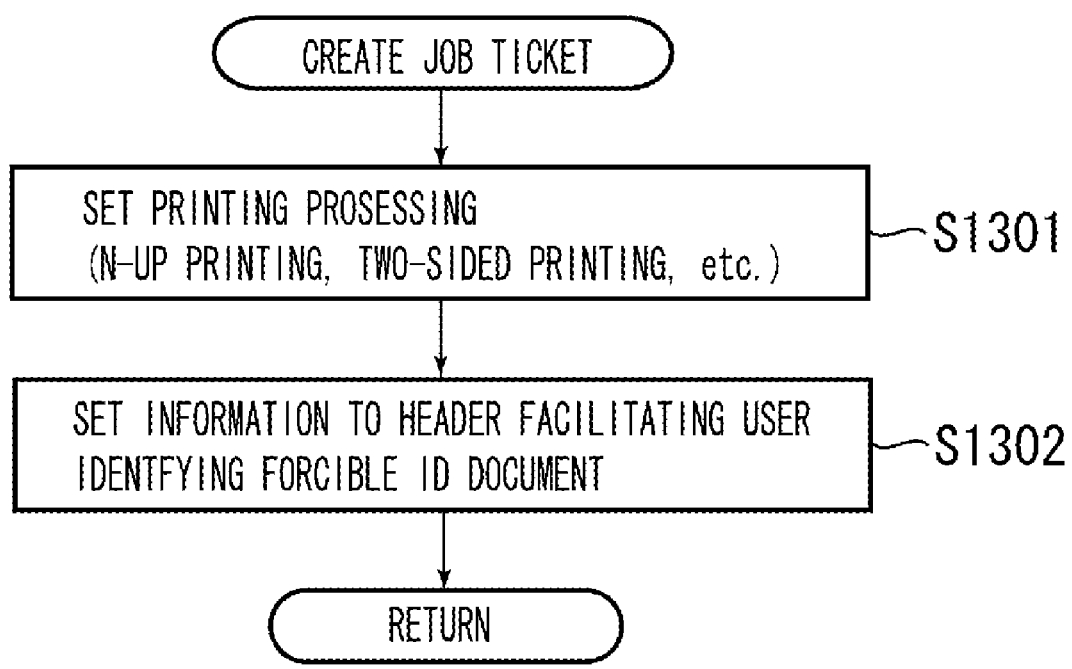
FIG. 13 is a flowchart illustrating an example of JOB ticket creation processing in step S1106 in FIG. 11.

An example of the JOB ticket creation processing in step S1106 in FIG. 11 will be described with reference to a flowchart in FIG. 13.

First, the information management agent 301 sets a print instruction to the forcible ID document, e.g., N-up printing, two-sided printing, or stapling (step S1301). The content of the print instruction is determined in advance. Then, the information management agent 301 sets information, as a header items, facilitating a user of the MFP 11 identifying the forcible ID document (step S1302). This information includes, e.g., a document name, an output page, and a user name. In the present embodiments, each information is set by the above-described steps so as to create the JOB ticket 306a.

Figure 14:
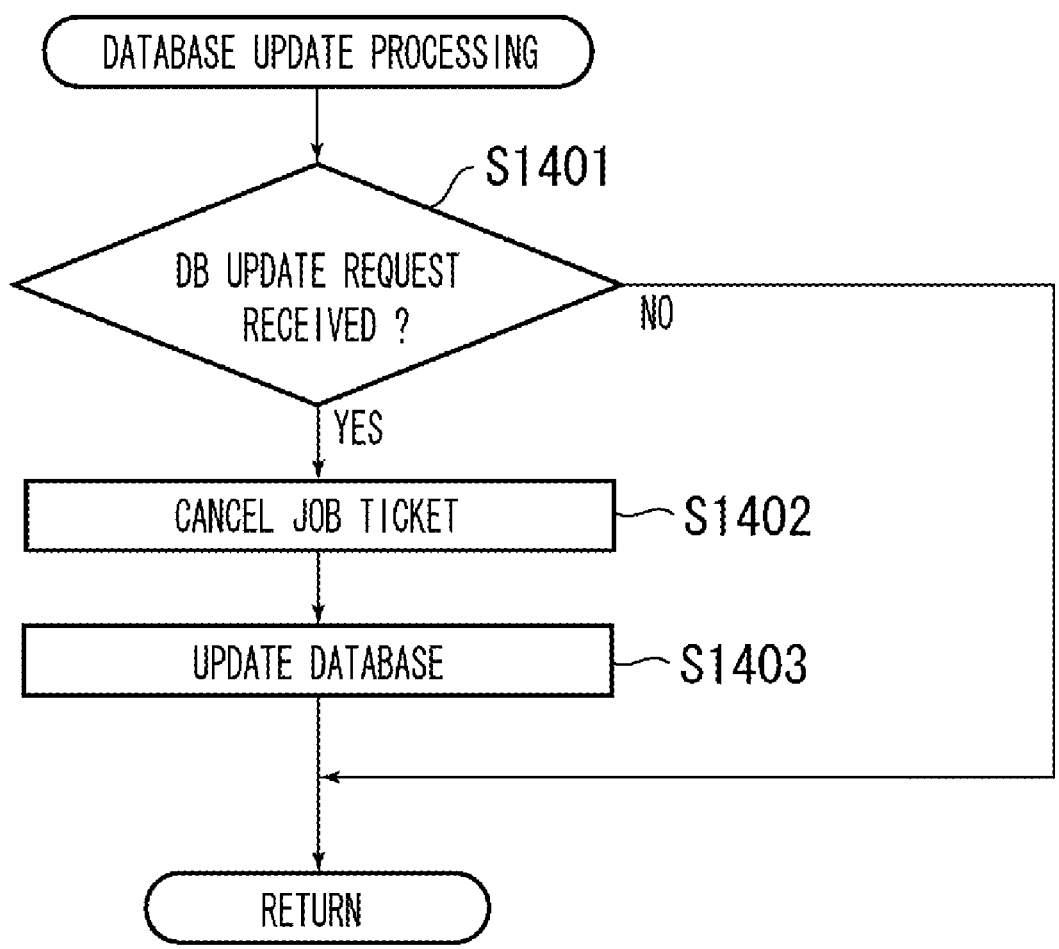
FIG. 14 is a flowchart illustrating an example of database update processing in an information management server according to an exemplary embodiment of the present invention.

An example of the database update processing in the information management server 12 will be described with reference to a flowchart in FIG. 14.

The information management agent 301 determines whether the request for updating the database 305a transmitted from the MFP agent 501 or the client agent 401 in step S1204 in FIG. 12 is received (step S1401). As a result of the determination, when the request for updating the database 305a is received (YES in step S1401), the information management agent 301 cancels or deletes the JOB ticket 306a temporarily stored in the temporary storage folder 306 (step S1402). Then, the information management agent 301 changes the status information added to the forcible ID document from the unread status to the read status to update the database 305a in the information management server 12 (step S1403).

As described above, in the present exemplary embodiment, an important document, a forcible ID, and status information are associated with one another to be registered in the database 305a in the information management server 12. The forcible identifies the important document, and the status information facilitates identifying whether the important document is already read or not.

When printing is performed by the MFP 11 according to the print instruction from the client PC 13, the client PC 13 asks the information management server 12 whether there is any important document that is not yet read by a user of the client PC 13. As a result, when there is an unread important document, the client PC 13 displays the forcible output message 801 on the monitor 26 to prompt the user to output the unread important document. Then, the client PC 13 prevents the user from performing processing, e.g., printing, with the MFP 11 if the user does not output the unread important document. In this case, the unread document may be output by printing via the MFP 11 or by displaying on the client PC 13. When the unread document is output by displaying on the client PC 13, the client PC 13 can check whether the important document is certainly read or not, e.g., check whether scrolling is performed up to the last of the document according to the importance of the document.

Similarly, when the MFP 11 is directly operated so as to perform copying or transmitting in facsimile, the MFP 11 asks the information management server 12 whether there is any important document that is not yet read by the user of the MFP 11. As a result, when there is an unread important document, the MFP 11 displays the forcible output message 801 on the operation panel 38 to prompt the user to output the unread important document. Then, the MFP 11 prevents the user from performing copying or transmitting in facsimile by the MFP 11 if the user does not output the unread important document.

As described above, a user is made to know the existence of an unread important document to be read by the user, and the user is inhibited from using the MFP 11 if the unread important document is not read by the user. Accordingly, the user is made to recognize the necessity to read the unread important document. As a result, the unread important document can be prevented from remaining unread, and it can be expected that the omission in notification of the unread important document decreases.

In addition, in the present exemplary embodiment, although the MFP agent 501 is set inside the MFP 11, the present invention is not limited to this arrangement. For example, a PC for managing an MFP can be provided in addition to the MFP so as to control management information for using the MFP and an operation of the MFP by the PC. In such an MFP, the MFP agent 501 can be installed on the incorporated HDD of the PC.

Moreover, one MFP 11 and one client PC 13 are illustrated in FIG. 1. However, the number of any one of the MFP 11 and the client PC 13 can be more than one.

Further, in the present exemplary embodiment, information to be shared by users of the MFP 11 or the client PC 13 is set as an important document. However, a user who needs to read the important document can be specified. In this case, the forcible ID can be arranged to identify a user who needs to read the important document, or a user ID for identifying a user who needs to read the important document can be registered in the database 305*a*.

Additionally, in the present exemplary embodiment, the system can be configured using a printer instead of or in addition to the MFP 11. The printer does not have the functions of copying, faxing, and scanning of the MFP 11, but has a function for printing based on a print instruction from the client PC 13. Therefore, when the system is configured using the printer instead of the MFP 11, for example, the processes in FIGS. 6 and 7 can be unnecessary. Further, a device without the printer function can be used instead of the MFP 11. In this case, as a method for forcible reading, a document can be printed by another printer or displayed on a display device. However, in this case, in order to confirm that the document is certainly read, the device may be permitted to operate if the following conditions are fulfilled. That is, an output paper sheet is taken out when a document is printed by another printer, or a predetermined time passes after printing of a document. Further, when a document is displayed on the display device, the device may be permitted to operate if a condition that scrolling is performed up to the last of the document is fulfilled.

OTHER EXEMPLARY EMBODIMENTS

In order to operate each type of devices to execute the functions of the above-described embodiment, program code of software to execute the functions of the above-described embodiment may be provided to a computer in a device or system connected with the each type of devices. The present invention includes operation of each type of devices according to a program stored in a computer (CPU or MPU) of the system or the device.

Further, in this case, the program code itself of the software can implement the functions of the above-described exemplary embodiments. Further, the present invention includes the program code itself, and a unit for providing the program code to the computer, i.e., a recording medium storing the program code. The recording medium storing the program code includes, for example, a flexible disk, a hard disk, an optical disk, a magneto-optical disk, a CD-ROM, a magnetic tape, a nonvolatile memory card, a ROM, and the like.

Also, the present invention includes not only the computer executing the provided program code so as to execute the functions of the above-described exemplary embodiments. An exemplary embodiment of the present invention also includes program code cooperating with an operating system or other application software operating on the computer so as to execute the functions of the above-described embodiment.

Moreover, after the provided program code is stored in a memory of a function expanding board of a computer, a CPU of the function expanding board performs a part or a whole of the actual processes, based on an instruction of the program code. The present invention also includes these processes by the CPU realizing the functions of the above-described embodiments.

Furthermore, after the provided program code is stored in a memory of a function expanding unit connected with a computer, a CPU of the function expanding unit performs a part or a whole of the actual processes, based on an instruction of the program code. The present invention also includes these processes by the CPU realizing the functions of the above-described embodiments.

According to the above-described embodiments, when a data processing apparatus receives notification information indicating that information to be read by a user is unread from an information management server, data processing required by the user is restricted until the user reads the unread information based on the notification information. Accordingly, the user who does not read the information cannot perform the data processing unless the user reads the information. Therefore, the user can be made to certainly read the information, e.g., a document.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-355168 filed Dec. 8, 2005, which is hereby incorporated by reference herein in its entirety.

What is claimed:

1. A data processing apparatus comprising:
an input unit configured to input identification information for identifying a user;
a reception unit configured to receive notification information indicating that there is unread information to be read by the user identified by the identification information, the notification information being not received if there is no unread information to be read by the identified user;
a data processing execution unit configured to execute print processing; and
a control unit configured to, if the notification information is received by the reception unit, restrict the data processing execution unit from executing print processing of data requested by the identified user which is different from the unread information until it is determined that the identified user has read the unread information, and if the notification information is not received by the reception unit, control the data processing execution unit to execute print processing of data requested by the identified user,
wherein, even if the notification information is received by the reception unit, the control unit enables the data processing execution unit to execute print processing of the unread information before the user reads the unread information.

2. The data processing apparatus according to claim 1, further comprising a notification unit configured to, when the reception unit receives the notification information indicating that there is unread information to be read by the identified user, notify the identified user that there is information that is not yet read by the identified user.

3. The data processing apparatus according to claim 1, further comprising:
an acceptance unit configured to accept a request for printing the unread information to be read by the identified user, wherein the data processing execution unit executes the print processing of the unread information after the acceptance unit accepts the request for printing the unread information.

4. The data processing apparatus according to claim 1, wherein the reception unit receives, from an external information management server, the notification information indicating that there is unread information to be read by the identified user.

5. The data processing apparatus according to claim 4, further comprising:
a user authentication unit configured to authenticate the user based on the identification information; and
a transmission unit configured to transmit user authentication information identifying the user authenticated by the user authentication unit to the external information management server,
wherein the reception unit receives, from the external information management server, the notification information indicating that there is unread information to be read by the identified user corresponding to the user authentication information transmitted by the transmission unit.

6. The data processing apparatus according to claim 1, wherein the data processing execution unit is a printer driver.

7. An information management system comprising an information management apparatus and a data processing apparatus, wherein:
the information management apparatus comprises:
a storage unit configured to store identification information identifying whether information to be read by each user is unread or read;
a first reception unit configured to receive user information identifying a user of a data processing apparatus that the user uses;
a determination unit configured to determine whether there is unread information to be read by the user based on the user information received by the reception unit and the identification information stored by the storage unit; and
a first transmission unit configured to, if it is determined by the determination unit that there is unread information to be read by the user, transmit notification information indicating that there is unread information to be read by the user to the data processing apparatus, wherein the transmission unit does not transmit the notification information to the data processing apparatus if it is not determined by the determination unit that there is unread information to be read by the user, and
the data processing apparatus comprises:
a data processing execution unit configured to execute print processing;
a second transmission unit configured to transmit the user information to the information management apparatus;
a second reception unit configured to receive the notification information from the information management apparatus; and
a control unit configured to, if the notification information is received by the second reception unit, restrict the data processing execution unit from executing print processing of data requested by the user which is different from the unread information until the user reads the unread information, and if the notification information is not received by the second reception unit, control the data processing execution unit to execute the print processing of data requested by the user,
wherein, even if the notification information is received by the second reception unit, the control unit enables the data processing execution unit to execute print processing of the unread information before the user reads the unread information.

8. The information management system according to claim 7, wherein
the information management apparatus further comprises:
a third transmission unit configured to transmit the unread information to be read by the user to the data processing apparatus, and
wherein, after the third transmission unit transmits the unread information to be read by the user the identification information stored in the storage unit identifies that the information to be read by the user is read.

9. A data processing method for controlling a data processing apparatus, the method comprising:
identifying a user of the data processing apparatus who is to request print processing from the data processing apparatus;
determining whether there is unread information to be read by the identified user;
executing print processing of data requested by the identified user if the determining step determines that there is no unread information to be read by the identified user; and
restricting the data processing apparatus from executing the print processing of data requested by the identified user which is different from the unread information until it is determined that the user has read the unread information, if the determining step determines that there is unread information to be read by the identified user,
wherein, even if the determining step determines that there is the unread information to be read by the identified user, print processing of the unread information is executed before the user reads the unread information.

10. A data processing apparatus comprising:
a data processing unit configured to execute print processing;
a determination unit configured to determine whether there is unread information to be read by a user; and
a control unit configured to, if the determination unit determines that there is unread information to be read by the user, restrict the data processing unit from executing print processing of data requested by the user which is different from the unread information until the user has read the unread information, and if the determination unit determines that there is no unread information to be read by the user, control the data processing unit to execute the print processing of data requested by the user,
wherein, even if the determination unit determines that there is unread information to be read by the user, the control unit enables the data processing unit to execute print processing of the unread information before the user reads the unread information.

11. A non-transitory computer readable medium containing computer-executable instructions for controlling a data processing apparatus, the medium comprising:
computer-executable instructions for inputting identification information for identifying a user;
computer-executable instructions for receiving notification information indicating that there is unread information to be read by the user identified by the input identification information, the notification information being not received if there is no unread information to be read by the identified user;

computer-executable instructions for, if the notification information is received, restricting the data processing apparatus from executing print processing of data requested by the identified user which is different from the unread information until it is determined that the identified user has read the unread information;

computer-executable instructions for, if the notification information is not received, controlling the data processing apparatus to execute the print processing of data requested by the identified user; and computer-executable instructions for, even if the notification information is received, controlling the data processing apparatus to execute print processing of the unread information before the user reads the unread information.

\* \* \* \* \*